(12) United States Patent
Wu

(10) Patent No.: US 10,715,573 B2
(45) Date of Patent: Jul. 14, 2020

(54) MEDIA PLAYING METHOD, TERMINAL DEVICE, AND COMPUTER STORAGE MEDIUM BASED ON TWO PLAYERS

(71) Applicant: TENCENT TECHNOLOGY (SHENZHEN) COMPANY LIMITED, Shenzhen (CN)

(72) Inventor: Fengkai Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 74 days.

(21) Appl. No.: 16/025,983

(22) Filed: Jul. 2, 2018

(65) Prior Publication Data

US 2018/0316737 A1    Nov. 1, 2018

Related U.S. Application Data

(63) Continuation of application No. PCT/CN2017/081021, filed on Apr. 19, 2017.

(30) Foreign Application Priority Data

Apr. 29, 2016    (CN) .......................... 2016 1 0289582

(51) Int. Cl.
*H04L 29/06* (2006.01)
*G06F 16/74* (2019.01)
(Continued)

(52) U.S. Cl.
CPC .......... *H04L 65/601* (2013.01); *G06F 16/745* (2019.01); *G06F 16/7867* (2019.01);
(Continued)

(58) Field of Classification Search
CPC . H04L 65/601; H04L 65/4084; H04L 65/602; H04L 65/607; H04L 67/06;
(Continued)

(56) References Cited

U.S. PATENT DOCUMENTS 8,400,918 B2 *   3/2013  Bing .............. H04N 21/234381
                                                        370/229
9,077,526 B2 *   7/2015  Lindahl ................. H04L 9/0891
(Continued)

FOREIGN PATENT DOCUMENTS

| CN | 102622196 A | 8/2012 |
|----|-------------|--------|
| CN | 104202684 A | 12/2014 |
| CN | 105430425 A | 3/2016 |
| CN | 105898625 A | 8/2016 |

OTHER PUBLICATIONS

The World Intellectual Property Organization (WIPO) International Search Report for PCT/CN2017/081021 dated Jun. 28, 2017 5 Pages (including translation).

*Primary Examiner* — Jimmy H Tran
(74) *Attorney, Agent, or Firm* — Anova Law Group, PLLC

(57) ABSTRACT

The present disclosure discloses a media playing method, a terminal device, and a computer storage medium. The method includes dividing content of a target file in a time dimension to obtain N number of target sub-files, where N is an integer greater than or equal to 2; obtaining a first time point, and determining an $n^{th}$ target sub-file in the N number of target sub-files based on the first time point, where n being an integer greater than or equal to 1 and less than or equal to N. The method also includes setting a first player and a second player, and controlling the first player and the second player to alternatingly obtain and output the $n^{th}$ target sub-file and at least one target sub-file that is after the $n^{th}$ target sub-file.

15 Claims, 6 Drawing Sheets

(51) Int. Cl.

| | |
|---|---|
| *G06F 16/78* | (2019.01) |
| *H04N 21/433* | (2011.01) |
| *H04N 21/262* | (2011.01) |
| *H04N 21/44* | (2011.01) |
| *H04N 21/845* | (2011.01) |
| *H04L 12/861* | (2013.01) |
| *H04L 29/08* | (2006.01) |

(52) U.S. Cl.
CPC .......... *H04L 49/90* (2013.01); *H04L 65/4084* (2013.01); *H04L 65/602* (2013.01); *H04L 65/607* (2013.01); *H04L 65/608* (2013.01); *H04L 67/06* (2013.01); *H04N 21/26258* (2013.01); *H04N 21/4331* (2013.01); *H04N 21/44004* (2013.01); *H04N 21/8456* (2013.01)

(58) Field of Classification Search
CPC ... H04L 65/608; H04L 49/90; H04N 21/8456; H04N 21/44004; H04N 21/26258; H04N 21/4331; H04N 21/8586; G06F 16/7867; G06F 16/745
See application file for complete search history.

(56) References Cited

U.S. PATENT DOCUMENTS

| | | | | |
|---|---|---|---|---|
| 9,270,724 | B1* | 2/2016 | Morgan | H04L 63/0435 |
| 10,237,195 | B1* | 3/2019 | Karach | H04L 47/30 |
| 10,565,754 | B2* | 2/2020 | Zeng | G11B 27/11 |
| 2012/0016965 | A1* | 1/2012 | Chen | H04N 21/23439 709/219 |
| 2012/0042050 | A1* | 2/2012 | Chen | H04L 65/607 709/219 |
| 2012/0170642 | A1* | 7/2012 | Braness | H04N 21/44004 375/240.01 |
| 2014/0025710 | A1* | 1/2014 | Sarto | G11B 27/002 707/823 |
| 2016/0269462 | A1* | 9/2016 | Kim | H04N 21/2343 |
| 2016/0337432 | A1* | 11/2016 | Persson | G06F 3/04842 |
| 2016/0337680 | A1* | 11/2016 | Kalagi | H04N 21/2662 |
| 2016/0365123 | A1* | 12/2016 | Wang | G11B 20/1262 |
| 2017/0041371 | A9* | 2/2017 | Thang | H04L 65/608 |
| 2017/0289213 | A1* | 10/2017 | Chen | H04L 47/6295 |
| 2019/0098367 | A1* | 3/2019 | Jung | H04N 21/2402 |

* cited by examiner

MEDIA PLAYING METHOD, TERMINAL DEVICE, AND COMPUTER STORAGE MEDIUM BASED ON TWO PLAYERS

RELATED APPLICATIONS

This application is a continuation application of PCT Patent Application No. PCT/CN2017/081021, filed on Apr. 19, 2017, which claims priority to Chinese Patent Application No. 201610289582.9 filed on Apr. 29, 2016, content of all of which is incorporated by reference in its entirety.

FIELD OF TECHNOLOGY

This application relates to audio/video playing technologies and, in particular, to a playing processing method, a terminal device, and a computer storage medium.

BACKGROUND

An existing audio/video playing technology mainly includes playing an entire video and playing small-segment transport stream (TS) based on Hypertext Transfer Protocol Live Streaming (HLS).

However, the existing audio/video playing technology has the following obvious defects: 1) during playing of an entire video, for a 1-hour mp4 (640*480) video, header information relied by video decoding has a size of 3M, and a player needs to spend more than 9 seconds to initially decode a first frame picture; therefore, the initial buffering takes a long time; 2) although playing of small-segment TS based on HLS greatly reduces the time for initial buffering, the video file must be in the TS format, using fixed 188 bytes of a media packet, both the fragmentation time and the encoding format thereof are limited and, further, an m3u8 list needs to be organized for parsing and playing by a player, greatly increasing storage I/O and decoding overheads.

The disclosed methods and systems are directed to solve one or more problems set forth above and other problems.

SUMMARY

To resolve the above problems in the existing art, the technical solutions of the present disclosure provides a playing processing method, a terminal device, and a computer storage medium.

One aspect of the present disclosure provides a media playing method. The method includes dividing content of a target file in a time dimension to obtain N number of target sub-files, where N is an integer greater than or equal to 2; obtaining a first time point, and determining an $n^{th}$ target sub-file in the N number of target sub-files based on the first time point, where n being an integer greater than or equal to 1 and less than or equal to N. The method also includes setting a first player and a second player, and controlling the first player and the second player to alternatingly obtain and output the $n^{th}$ target sub-file and at least one target sub-file that is after the $n^{th}$ target sub-file. The process of controlling the first player and the second player to alternatingly obtain and output the $n^{th}$ target sub-file and at least one target sub-file that is after the $n^{th}$ target sub-file comprises: controlling the first player to obtain the $n^{th}$ target sub-file and output the $n^{th}$ target sub-file; before outputting of the $n^{th}$ target sub-file on the first player is completed, controlling the second player to obtain an $(n+1)^{th}$ target sub-file neighboring to the $n^{th}$ target sub-file in the time dimension; after detecting that the first player completes outputting of the $n^{th}$ target sub-file, controlling the second player to output the $(n+1)^{th}$ target sub-file; before outputting of the $(n+1)^{th}$ target sub-file on the second player is completed, controlling the first player to obtain an $(n+2)^{th}$ target sub-file neighboring to the $(n+1)^{th}$ target sub-file in the time dimension; and repeatedly controlling the first player and the second player to alternatingly output any remaining target sub-files until outputting of the $n^{th}$ target sub-file and the at least one target sub-file that is after the $n^{th}$ target sub-file is all completed.

Another aspect of the present disclosure provides terminal device. The terminal device includes a memory storing computer program instructions; and a processor coupled to the memory. When executing the computer program instructions, configured to perform: dividing content of a target file in a time dimension to obtain N number of target sub-files, where N is an integer greater than or equal to 2; obtaining a first time point, and determining an $n^{th}$ target sub-file in the N number of target sub-files based on the first time point, where n is an integer greater than or equal to 1 and less than or equal to N; and setting a first player and a second player, and controlling the first player and the second player to alternatingly obtain and output the $n^{th}$ target sub-file and at least one target sub-file that is after the $n^{th}$ target sub-file. The process of controlling the first player and the second player to alternatingly obtain and output the $n^{th}$ target sub-file and at least one target sub-file that is after the $n^{th}$ target sub-file comprises: controlling the first player to obtain the $n^{th}$ target sub-file and output the $n^{th}$ target sub-file; before outputting of the $n^{th}$ target sub-file on the first player is completed, controlling the second player to obtain an $(n+1)^{th}$ target sub-file neighboring to the $n^{th}$ target sub-file in the time dimension; after detecting that the first player completes outputting of the $n^{th}$ target sub-file, controlling the second player to output the $(n+1)^{th}$ target sub-file; before outputting of the $(n+1)^{th}$ target sub-file on the second player is completed, controlling the first player to obtain an $(n+2)^{th}$ target sub-file neighboring to the $(n+1)^{th}$ target sub-file in the time dimension; and repeatedly controlling the first player and the second player to alternatingly output any remaining target sub-files until outputting of the $n^{th}$ target sub-file and the at least one target sub-file that is after the $n^{th}$ target sub-file is all completed.

Another aspect of the present disclosure provides a non-transitory computer-readable storage medium. The non-transitory computer-readable storage medium stores computer program instructions executable by at least one processor to perform: dividing content of a target file in a time dimension to obtain N number of target sub-files, where N is an integer greater than or equal to 2; obtaining a first time point, and determining an $n^{th}$ target sub-file in the N number of target sub-files based on the first time point, where n is an integer greater than or equal to 1 and less than or equal to N; and setting a first player and a second player, and controlling the first player and the second player to alternatingly obtain and output the $n^{th}$ target sub-file and at least one target sub-file that is after the $n^{th}$ target sub-file. The process of controlling the first player and the second player to alternatingly obtain and output the $n^{th}$ target sub-file and at least one target sub-file that is after the $n^{th}$ target sub-file comprises: controlling the first player to obtain the $n^{th}$ target sub-file and output the $n^{th}$ target sub-file; before outputting of the $n^{th}$ target sub-file on the first player is completed, controlling the second player to obtain an $(n+1)^{th}$ target sub-file neighboring to the $n^{th}$ target sub-file in the time dimension; after detecting that the first player completes outputting of the $n^{th}$ target sub-file, controlling the second player to output the $(n+1)^{th}$ target sub-file; before outputting of the (n+1)$^{th}$ target sub-file on the second player is completed, controlling the first player to obtain an (n+2)$^{th}$ target sub-file neighboring to the (n+1)$^{th}$ target sub-file in the time dimension; and repeatedly controlling the first player and the second player to alternatingly output any remaining target sub-files until outputting of the n$^{th}$ target sub-file and the at least one target sub-file that is after the n$^{th}$ target sub-file is all completed.

Other aspects of the present disclosure can be understood by those skilled in the art in light of the description, the claims, and the drawings of the present disclosure.

DETAILED DESCRIPTION

The technical solutions of the present disclosure are further described below in detail with reference to accompanying drawings and specific embodiments.

Figure 1:
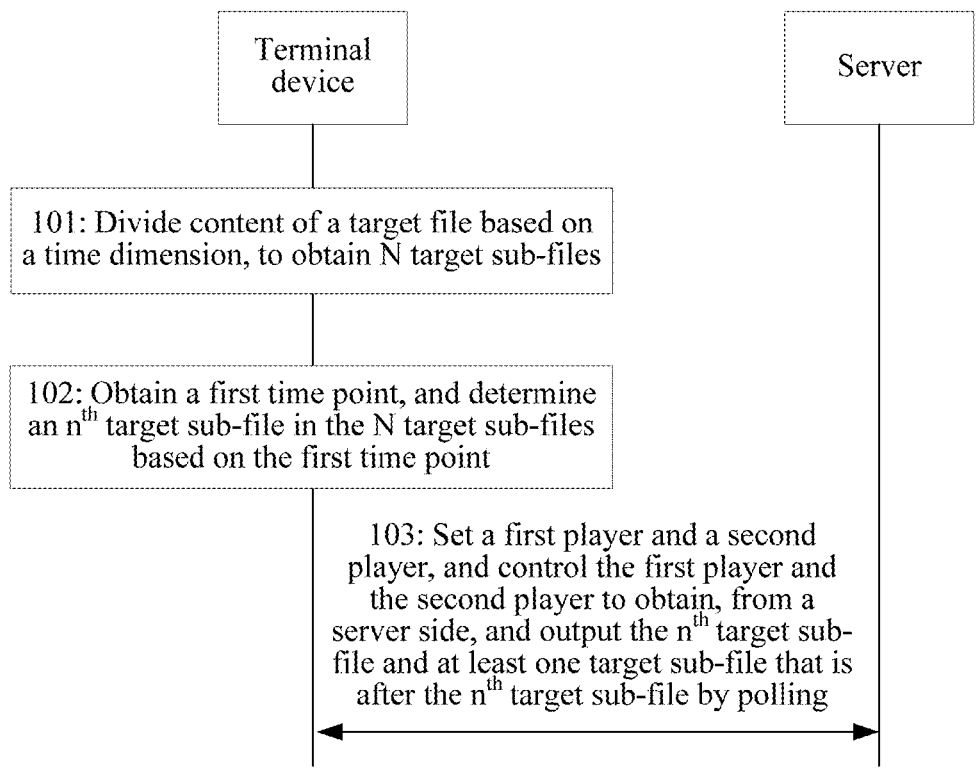
FIG. 1 is a schematic diagram of an implementation procedure of a playing processing method according to an embodiment of the present disclosure.

The present disclosure provides a method for playing media files. The method is applied to cooperative communication between a terminal device and a server. As shown in FIG. 1, the method includes the followings.

Step 101: A terminal device divides content of a target file in a time dimension, to obtain N number of target sub-files, where N is an integer greater than or equal to 2. The target file may be an audio or video file.

Specifically, the terminal device may divide the content of the target file in the time dimension equally or unequally. In an example of equal division, the terminal device may divide a Blu-ray video file (1080P) into video fragments each of a 20-minute length and, thus, a film video of total duration of one hour can be divided into 3 sub-video fragments. Or a high-definition (480P) video can be divided equally into sub-video fragments each of a 5-minute length. In an example of unequal division, the terminal device may unequally divide the target file according to a preset division rule, such as in a progressive fragment duration of 1 minutes, 3 minutes, and 5 minutes, and so on. Certainly, in an actual application, the terminal device may further divide the target file in a decreasing fragment duration or according to any other division rules.

Unlike the existing small-segment TS playing technology based on HLS, when the target file is divided, there is not specific requirements on the file format, fragment duration, and the like.

Step 102: The terminal device obtains a first time point, and determines an n$^{th}$ target sub-file in the N number of target sub-files based on the first time point, n being an integer greater than or equal to 1 and less than or equal to N.

Specifically, the terminal device may use the beginning of the target file as the first time point by default, or may use a location to which a playing progress bar is dragged as the first time point. Further, the terminal device determines the n$^{th}$ target sub-file in the N number of target sub-files based on the first time point. When the terminal device uses the beginning of the target file as the first time point, the n$^{th}$ target sub-file determined in the N number of target sub-files based on the first time point is a first target sub-file.

Step 103: The terminal device sets a first player and a second player, and controls the first player and the second player to alternatingly obtain and output, from the server side, the n$^{th}$ target sub-file and at least one target sub-file that is after the n$^{th}$ target sub-file.

The controlling the first player and the second player to alternatingly obtain and output the n$^{th}$ target sub-file and at least one target sub-file that is after the n$^{th}$ target sub-file includes: controlling the first player to obtain the n$^{th}$ target sub-file from the server side and output the n$^{th}$ target sub-file on the first player; controlling the second player to obtain an (n+1)$^{th}$ target sub-file neighboring to the n$^{th}$ target sub-file in the time dimension from the server side before outputting of the n$^{th}$ target sub-file on the first player is completed; detecting that the first player completes outputting of the n$^{th}$ target sub-file, and controlling the second player to output the (n+1)$^{th}$ target sub-file; before outputting of the (n+1)$^{th}$ target sub-file is completed, controlling the first player to obtain an (n+2)$^{th}$ target sub-file neighboring to the (n+1)$^{th}$ target sub-file in the time dimension from the server side, and so on, until outputting of the n$^{th}$ target sub-file and the at least one target sub-file that is after the n$^{th}$ target sub-file is all completed.

Figure 2:
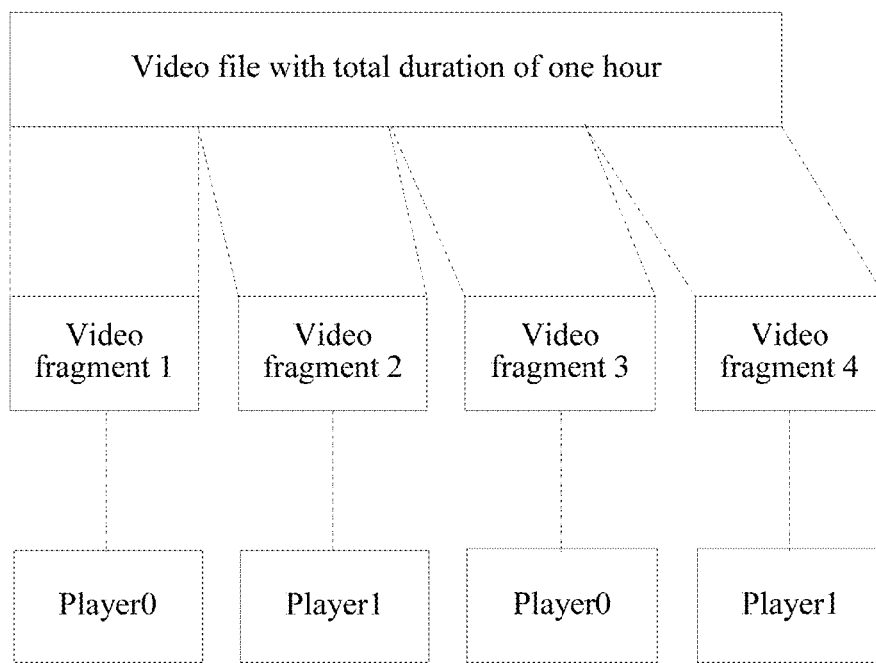
FIG. 2 is a schematic diagram of controlling two players to alternately buffer and play a target file according to an embodiment of the present disclosure.

For example, the terminal device uses the beginning of a video file with total duration of one hour as the first time point to perform equal division, and obtains video sub-files of four fragments shown in FIG. 2, which are respectively a video fragment 1, a video fragment 2, a video fragment 3, and a video fragment 4. Duration of each fragment is 15 minutes. Further, as shown in FIG. 2, the terminal device sets a first player player0 and a second player player1 to start to buffer and play alternatingly from the beginning of the video, that is, starting with the video fragment 1, the video fragment 2, the video fragment 3, and the video fragment 4. Specifically, the terminal device controls the first player player0 to buffer and play the video fragment 1; before playing of the video fragment 1 is completed, controls the second player player1 to buffer the video fragment 2; detects that the first player player0 completes playing the video fragment 1, and controls the second player player1 to start to play the video fragment 2; before the second player player1 completes playing the video fragment 2, controls the first player player0 to buffer the video fragment 3, and so on, until the second player player1 completes playing the video fragment 4, i.e., all video sub-files are completed.

In an implementation, the controlling, by the terminal device, the second player to obtain an $(n+1)^{th}$ target sub-file neighboring to the $n^{th}$ target sub-file in the time dimension before output of the $n^{th}$ target sub-file is completed includes: controlling the second player to enter a buffering state when outputting of the $n^{th}$ target sub-file on the first player is started; obtaining and buffering the $(n+1)^{th}$ target sub-file from the server based on address information of the $(n+1)^{th}$ target sub-file of the target file on the server; and parsing the $(n+1)^{th}$ target sub-file.

Figure 3:
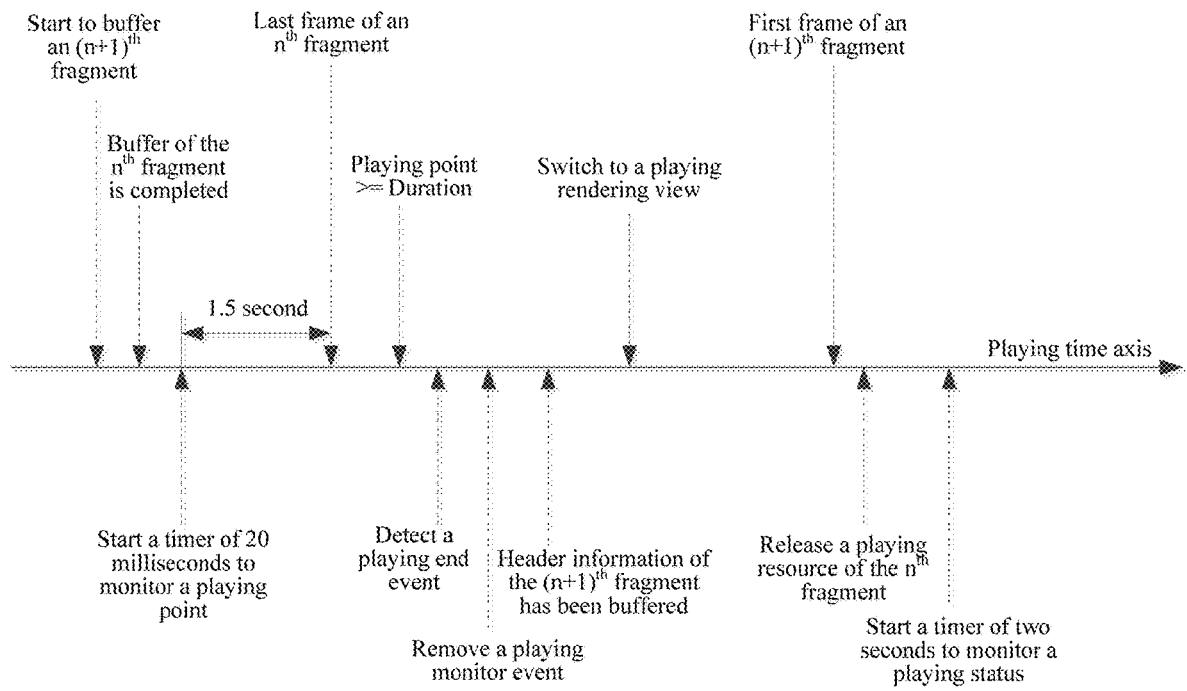
FIG. 3 is a schematic diagram of a playing time sequence of controlling two players to implement seamless handover according to an embodiment of the present disclosure.

For example, as shown in FIG. 3, before the terminal device completes controlling the first player to buffer the $n^{th}$ target sub-file, if it is detected that the remaining time before the first player completes buffering the $n^{th}$ target sub-file is less than 1 second, the second player is controlled to start to buffer the $(n+1)^{th}$ target sub-file.

By using the media playing method, a terminal device divides content of a target file in the time dimension to obtain N number of target sub-files; obtains a first time point, and determines an $n^{th}$ target sub-file in the N number of target sub-files based on the first time point; sets a first player and a second player, and controls the first player and the second player to alternatingly obtain and output the $n^{th}$ target sub-file and at least one target sub-file after the $n^{th}$ target sub-file. Therefore, two players are controlled to alternatingly buffer and play a video fragment stream, so as to greatly reduce initial buffer time. Moreover, in the entire video playing process, fragments of the target file can be flexibly played, without limitation on the fragment time, the encoding format, and the like, and seamless handover is effectively implemented when multiple video fragments are played.

Figure 4:
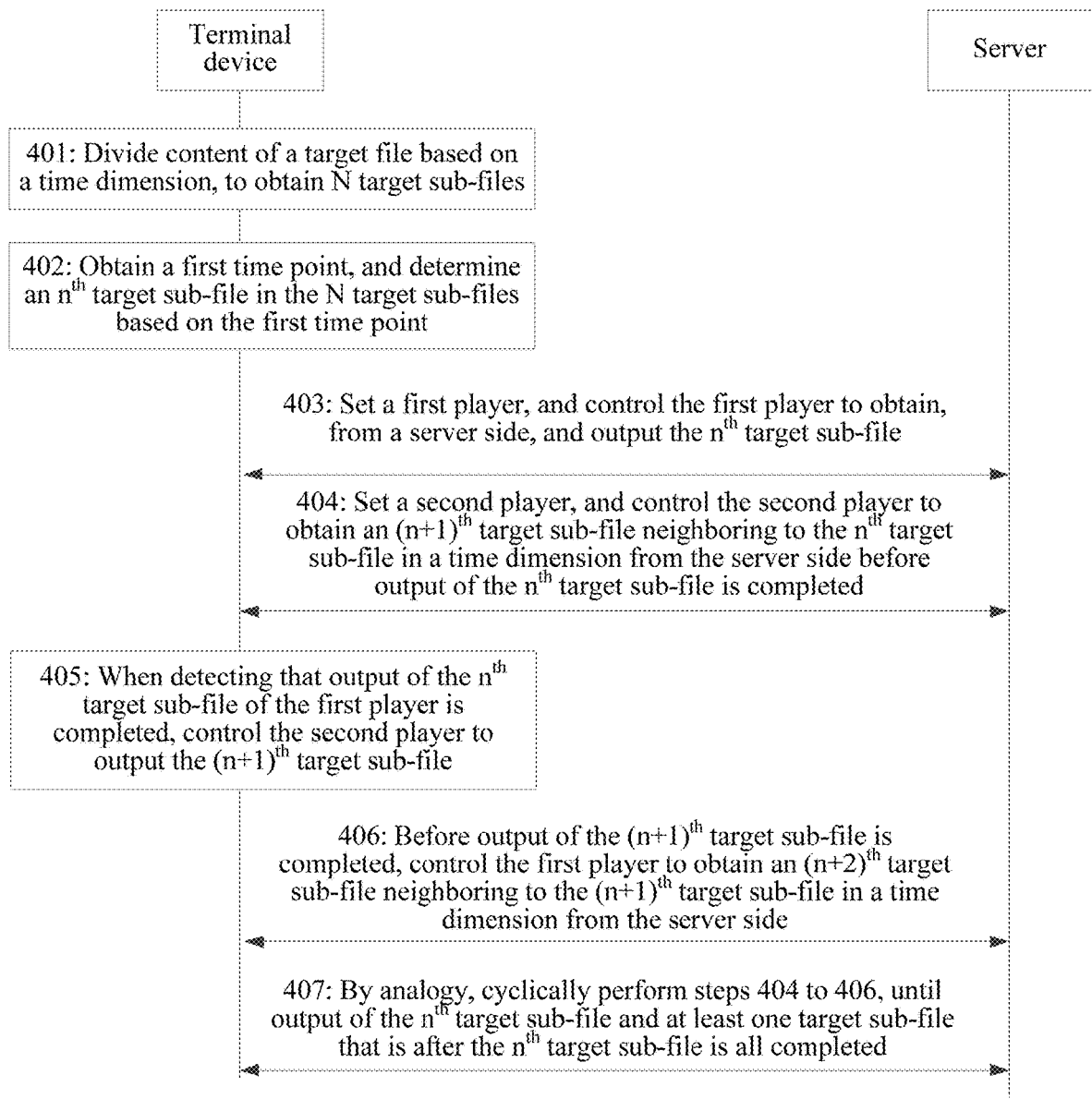
FIG. 4 is a schematic diagram of a playing processing method according to an embodiment of the present disclosure.

The present disclosure also provides a media playing method. The method is applied to cooperative communication between a terminal device and a server. As shown in FIG. 4, the method includes the followings.

Step 401: A terminal device divides content of a target file in the time dimension to obtain N number of target sub-files, N being an integer greater than or equal to 2. The target file may be an audio or video file.

Specifically, the terminal device divides content of the target file in the time dimension equally or unequally. In an example of equal division, the terminal device may divide a Blu-ray video file (1080P) fragment into video fragments each of which is 20 minutes long, dividing a film video of total duration of one hour into 3 sub-video fragments, or may divide a high-definition (480P) video equally into sub-video fragments each of which is 5 minutes long. In an example of unequal division, the terminal device may unequally divide the target file according to a preset division rule in a progressive fragment duration such as 1 minutes, 3 minutes, and 5 minutes. Certainly, in an actual application, the terminal device may further divide the target file in a decreasing fragment duration according to any other division rules.

Thus, compared with an existing small-segment TS playing technology based on HLS, in the present disclosure, when the target file is divided, the file format, fragment duration, and the like has no limitation.

Step 402: The terminal device obtains a first time point, and determines an $n^{th}$ target sub-file in the N number of target sub-files based on the first time point, n being an integer greater than or equal to 1 and less than or equal to N.

Specifically, the terminal device may use the beginning of the target file as the first time point by default, or may use a location to which a playing progress bar is dragged as the first time point. Next, the terminal device determines the $n^{th}$ target sub-file in the N number of target sub-files based on the first time point. When the terminal device uses the beginning of the target file as the first time point, the $n^{th}$ target sub-file determined in the N number of target sub-files based on the first time point is a first target sub-file.

Step 403: The terminal device sets a first player, and controls the first player to obtain from a server the $n^{th}$ target sub-file, and output or play the obtained $n^{th}$ target sub-file.

Step 404: The terminal device sets a second player, and controls the second player to obtain an $(n+1)^{th}$ target sub-file neighboring to the $n^{th}$ target sub-file in the time dimension from the server before outputting of the $n^{th}$ target sub-file on the first player is completed.

In an implementation, specifically, the terminal device controls the second player to enter a buffering state when outputting of the $n^{th}$ target sub-file on the first player is started; and to obtain and buffer the $(n+1)^{th}$ target sub-file from the server based on address information of the $(n+1)^{th}$ target sub-file of the target file on the server; and parse the $(n+1)^{th}$ target sub-file.

For example, as shown in FIG. 3, before the terminal device completes controlling the first player to buffer the $n^{th}$ target sub-file, if it is detected that the remaining time before the first player completes buffering the $n^{th}$ target sub-file is less than 1 second or other predetermined value, the second player is controlled to start to buffer the $(n+1)^{th}$ target sub-file.

Step 405: When detecting that outputting of the $n^{th}$ target sub-file of the first player is completed, the terminal device controls the second player to output the $(n+1)^{th}$ target sub-file.

Step 406: Before outputting of the $(n+1)^{th}$ target sub-file on the second player is completed, the terminal device controls the first player to obtain an $(n+2)^{th}$ target sub-file neighboring to the $(n+1)^{th}$ target sub-file in the time dimension from the server.

Step 407: The terminal device continues to perform steps 404 to 406, until outputting of the $n^{th}$ target sub-file and all target sub-files after the $n^{th}$ target sub-file are all completed.

For example, the terminal device uses the beginning of a video file with total duration of one hour as the first time point to perform equal division, and obtains video sub-files of four fragments shown in FIG. 2, which are respectively a video fragment 1, a video fragment 2, a video fragment 3, and a video fragment 4. Duration of each fragment is 15 minutes. Further, as shown in FIG. 2, the terminal device sets a first player player0 and a second player player1 to start to buffer and play from the beginning of the video, that is, the video sub-files of the first video fragment 1, and the video fragment 2, the video fragment 3, and the video fragment 4 that are after the beginning of the video by polling from the server. Specifically, the terminal device controls the first player player0 to buffer and play the video fragment 1; before playing of the video fragment 1 is completed, controls the second player player1 to buffer the video fragment 2; detects that the first player player0 completes playing the video fragment 1, and controls the second player player1 to start to play the video fragment 2; before the second player player1 completes playing the video fragment 2, controls the first player player0 to buffer the video fragment 3, and so on, until the second player player1 completes playing the video fragment 4.

Using the media playing method in the present disclosure, the terminal device controls two players to alternatingly buffer and play a video fragment stream, so as to greatly reduce initial buffer time. Moreover, in the entire video playing process, fragments of the target file can be flexibly played, without limitation on the fragment time, the encoding format, and the like, and seamless handover is effectively implemented when multiple video fragments are played.

Figure 5:
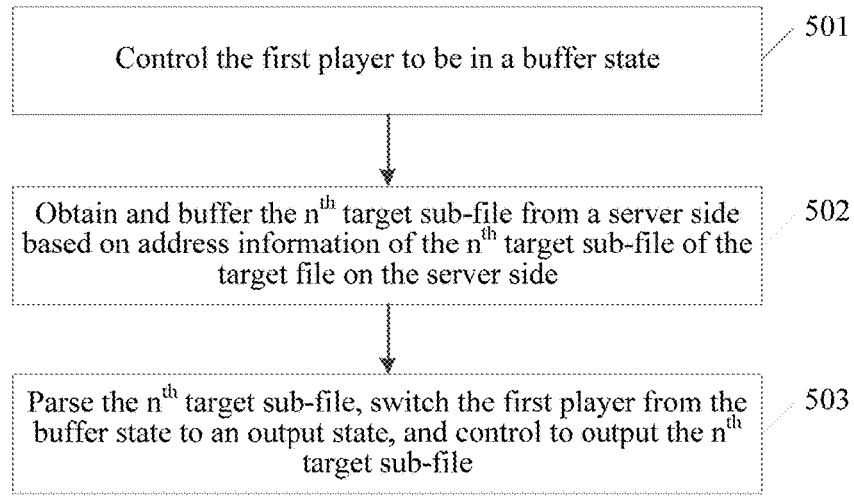
FIG. 5 is a schematic diagram of a process of obtaining and outputting an n$^{th}$ target sub-file according to an embodiment of the present disclosure.

As shown in FIG. 5, based on previous embodiments, in the present disclosure, the process of controlling the first player to obtain the $n^{th}$ target sub-file and output the $n^{th}$ target sub-file may include the followings.

Step 501: Controlling the first player to be in a buffering state.

Step 502: Obtaining and buffering the $n^{th}$ target sub-file from the server based on address information of the $n^{th}$ target sub-file of the target file on the server.

Step 503: Parsing the $n^{th}$ target sub-file, switching the first player from the buffering state to an outputting state, and controlling to output or play the $n^{th}$ target sub-file.

Figure 6:
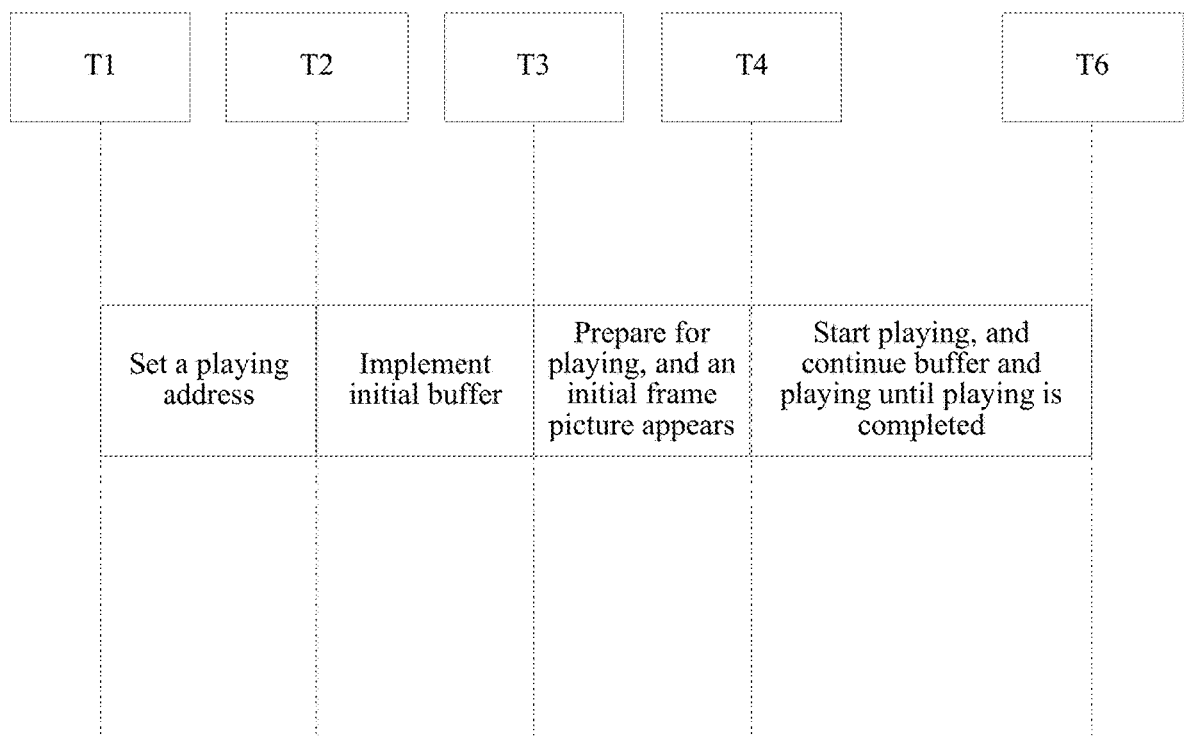
FIG. 6 is a schematic diagram of moments of buffering and playing an n$^{th}$ target sub-file by a first player according to an embodiment of the present disclosure.

For example, as shown in FIG. 6, in the present disclosure, in a corresponding process of T1 to T6 in which the terminal device obtains and outputs the $n^{th}$ target sub-file, the terminal device sets the address information such as a uniform resource locator (URL) of the $n^{th}$ target sub-file on the server at the moment T1 according to the time dimension corresponding to the $n^{th}$ target sub-file in the entire target file, that is, sets a playing address. At the moment T2, the terminal device controls the first player to connect to the URL to obtain and buffer header information of the $n^{th}$ target sub-file from the server, that is, the first player implements initial buffer. At the moment T3, the terminal device controls the first player to parse the header information of the $n^{th}$ target sub-file, that is, the first player prepares for playing the $n^{th}$ target sub-file, and an initial frame picture appears. At the moments T4 to T6, while the terminal device controls the first player to play the header file of the $n^{th}$ target sub-file, remaining parts of the $n^{th}$ target sub-file continue to be buffered, that is, playing starts. In the playing process, buffering and playing continue, until playing of the $n^{th}$ target sub-file is completed. From the moment T6, the first player starts to buffer and play a new target sub-file again.

In the media playing method in the present disclosure, after the terminal device controls the first player to buffer the header information of the $n^{th}$ target sub-file, playing of the $n^{th}$ target sub-file may start, thereby greatly reducing initial buffer time.

Figure 7:
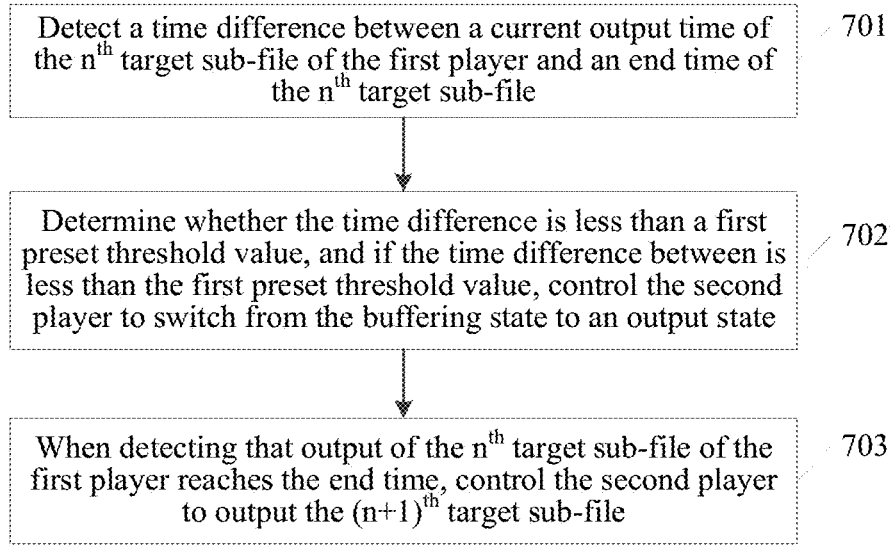
FIG. 7 is a schematic diagram of a process of controlling a second player to output an (n+1)$^{th}$ target sub-file according to an embodiment of the present disclosure.

As shown in FIG. 7, based on previous embodiments, in the present disclosure, the process of detecting that the first player completes outputting of the $n^{th}$ target sub-file, and controlling the second player to output the $(n+1)^{th}$ target sub-file includes the followings.

Step 701: Detecting a time difference between a current output time of the $n^{th}$ target sub-file of the first player and an end time of the $n^{th}$ target sub-file.

Step 702: Determining whether the time difference is less than a first preset threshold value, and if the time difference is less than the first preset threshold value, controlling the second player to switch from the buffering state to an outputting state.

The first preset threshold value may be determined with reference to both an entire playing rate and a buffer capability of a player.

Step 703: When detecting that outputting of the $n^{th}$ target sub-file of the first player reaches the end time, control the second player to output the $(n+1)^{th}$ target sub-file.

The detecting that outputting of the $n^{th}$ target sub-file of the first player reaches the end time may be performed in the following two methods.

Method 1: detecting whether a current output time at which the first player plays the $n^{th}$ target sub-file is greater than or equal to the duration of the $n^{th}$ target sub-file, and if the current output time at which the first player plays the $n^{th}$ target sub-file is greater than or equal to the duration of the $n^{th}$ target sub-file, determining that outputting of the $n^{th}$ target sub-file by the first player reaches the end time. For example, as shown in FIG. 3, when it is detected that the current output time of the first player is greater than or equal to the duration of the $n^{th}$ target sub-file, that is, the playing point>=duration, switching to playback rendering, that is, the second player is controlled to output the $(n+1)^{th}$ target sub-file.

Method 2: A timer is started to monitor whether a playing end event occurs, that is, the timer is used to monitor whether the first player has completed playing the last frame of the video stream of the $n^{th}$ target sub-file. If the first player has completed playing the last frame of the video stream of the $n^{th}$ target sub-file, a playing end event is detected, and it is determined that outputting of the $n^{th}$ target sub-file by the first player reaches the end time. For example, as shown in FIG. 3, when it is detected that a time difference between the current output time of the $n^{th}$ target sub-file of the first player and the end time of the $n^{th}$ target sub-file is less than the first preset threshold value, for example, less than 1.5 seconds, the first player starts a timer to monitor a playing end event. After a playing end event is detected, the playing monitor event is removed, and the second player is controlled to start to output a header file of the $(n+1)^{th}$ target sub-file.

In the media playing method in the present disclosure, the terminal device controls two players to alternatingly buffer and play a video fragment stream, thereby effectively implementing seamless handover when multiple video fragments are played.

Figure 8:
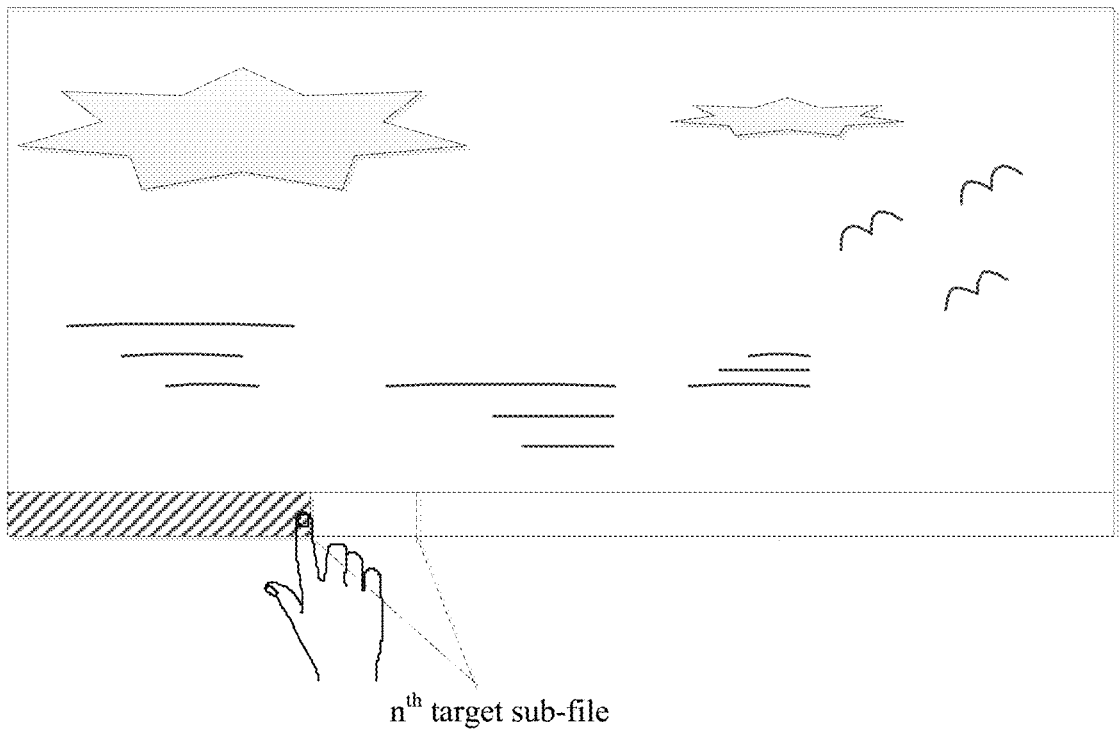
FIG. 8 is a schematic diagram of an application scenario of playing a video file according to an embodiment of the present disclosure.

Based on previous embodiments, with reference to an application scenario of implementing video file playing shown in FIG. 8, in the application scenario, a location to which a playing progress bar is dragged is used as the first time point. In the present disclosure, the determining an $n^{th}$ target sub-file in the N number of target sub-files based on the first time point includes: determining, based on the first time point and duration of each of the N number of target sub-files, the $n^{th}$ target sub-file corresponding to the first time point.

In an implementation, in the present disclosure, the outputting the $n^{th}$ target sub-file includes: determining an initial output time point of the $n^{th}$ target sub-file based on the first time point and duration of the $n^{th}$ target sub-file; and outputting the $n^{th}$ target sub-file based on the initial output time point.

Figure 9:
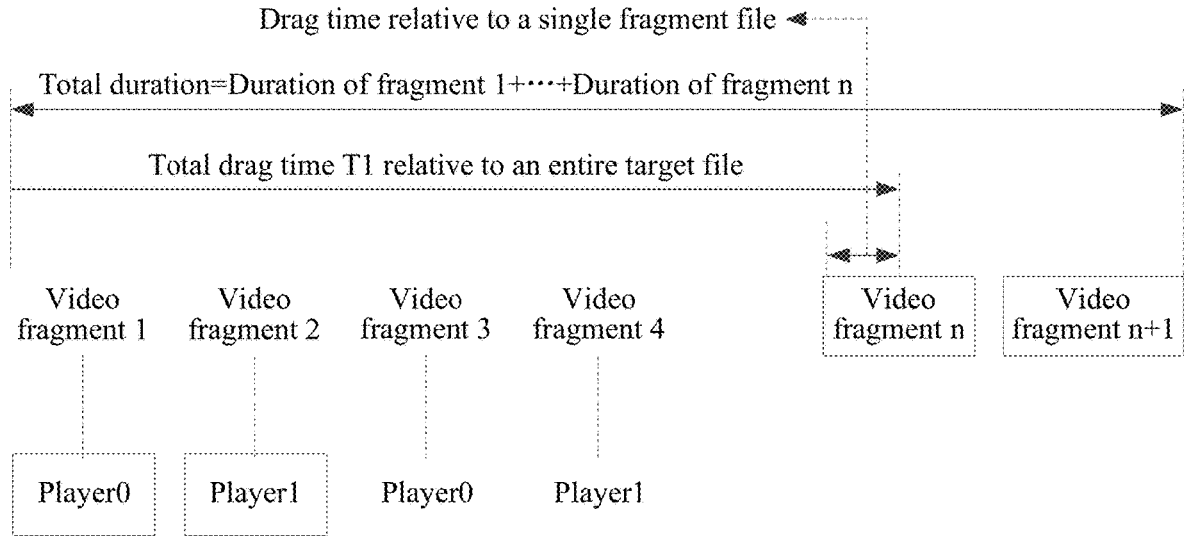
FIG. 9 is a schematic diagram of a drag time sequence of a playing progress bar according to an embodiment of the present disclosure.

For example, as shown in FIG. 9, in playing processing of dragging a playing progress bar, the $n^{th}$ target sub-file corresponding to the first time point is determined as:

n=[total drag duration T1/fragment duration S relative to the entire target file]. The initial output time point of the $n^{th}$ target sub-file is determined based on the first time point and duration of the $n^{th}$ target sub-file.

That is, relative to a drag time T2 of a single fragment file, T2=total drag duration T1-a quantity n of dragged fragments*fragment duration S. Further, the outputting the $n^{th}$ target sub-file based on the initial output time point includes: If an $n^{th}$ video to which the dragging is performed is a video fragment being played by a currently playing player0, a query seek interface [seek:T2] of the first player player0 is directly queried for. If an $n^{th}$ video to which the dragging is performed is a video being buffered by the buffering player or player1, the second player player1 is switched as a player for playing, and the playing rendering view is brought to front, and a query seek interface [seek:T2] of the second player player1 is invoked. In cases other than the foregoing two cases, the two players of the first player player0 and the second player player1 are directly reset, that is, a new playing process is restarted, the playing address URL of the $n^{th}$ fragment or $n^{th}$ target sub-file is set for the first player player0, and the second player player1 buffers an $(n+1)^{th}$ video fragment. Herein, total duration of a playing progress bar=fragment duration S*a total quantity n of fragments; and a current time T for playing in the progress bar=a quantity of played fragments*fragment duration S+a time for playing a current video fragment.

Figure 10:
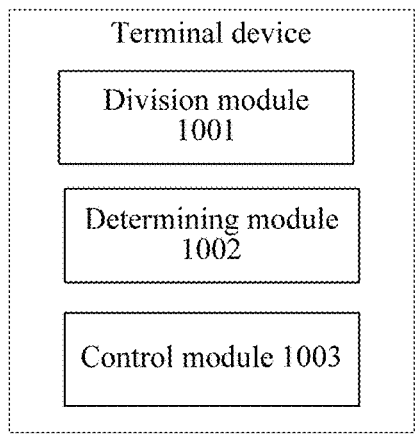
FIG. 10 is a schematic structural diagram of a terminal device according to an embodiment of the present disclosure.

The present disclosure also provides a terminal device. As shown in FIG. 10, the terminal device includes a division module 1001, a determining module 1002, and a control module 1003.

The division module 1001 is configured to divide content of a target file in the time dimension, to obtain N number of target sub-files, N being an integer greater than or equal to 2.

The determining module 1002 is configured to: obtain a first time point, and determine an $n^{th}$ target sub-file in the N number of target sub-files based on the first time point, n being an integer greater than or equal to 1 and less than or equal to N.

The control module 1003 is configured to: set a first player and a second player, and control the first player and the second player to alternatingly obtain and output the $n^{th}$ target sub-file and at least one target sub-file that is after the $n^{th}$ target sub-file.

The controlling, by the control module 1003, the first player and the second player to alternatingly obtain and output the $n^{th}$ target sub-file and at least one target sub-file that is after the $n^{th}$ target sub-file includes: controlling the first player to obtain the $n^{th}$ target sub-file and output the $n^{th}$ target sub-file; controlling the second player to obtain an $(n+1)^{th}$ target sub-file neighboring to the $n^{th}$ target sub-file in the time dimension before outputting of the $n^{th}$ target sub-file is completed; detecting that the first player completes outputting of the $n^{th}$ target sub-file, and controlling the second player to output the $(n+1)^{th}$ target sub-file; before outputting of the $(n+1)^{th}$ target sub-file is completed, controlling the first player to obtain an $(n+2)^{th}$ target sub-file neighboring to the $(n+1)^{th}$ target sub-file in the time dimension, and so on, until outputting of the $n^{th}$ target sub-file and the target sub-files after the $n^{th}$ target sub-file is all completed.

In an implementation, the control module 1003 is further configured to: control the first player to be in a buffering state; obtain and buffer the $n^{th}$ target sub-file from a server based on address information of the $n^{th}$ target sub-file of the target file on the server; and parse the $n^{th}$ target sub-file, switch the first player from the buffering state to an outputting state, and control to output the $n^{th}$ target sub-file.

In an implementation, the control module 1003 is further configured to: control the second player to enter a buffering state when outputting of the $n^{th}$ target sub-file is started; obtain and buffer the $(n+1)^{th}$ target sub-file from the server based on address information of the $(n+1)^{th}$ target sub-file of the target file on the server; and parse the $(n+1)^{th}$ target sub-file.

In an implementation, the control module 1003 is further configured to: detect a time difference between a current output time of the $n^{th}$ target sub-file of the first player and an end time of the $n^{th}$ target sub-file; determine whether the time difference is less than a first preset threshold value, and if the time difference between is less than the first preset threshold value, control the second player to switch from the buffering state to an outputting state; and when detecting that outputting of the $n^{th}$ target sub-file of the first player reaches the end time, control the second player to output the $(n+1)^{th}$ target sub-file.

In an implementation, the determining module 1002 is further configured to determine, based on the first time point and duration of each of the N number of target sub-files, the $n^{th}$ target sub-file corresponding to the first time point.

In an implementation, the control module 1003 is further configured to: determine an initial output time point of the $n^{th}$ target sub-file based on the first time point and duration of the $n^{th}$ target sub-file; and output the $n^{th}$ target sub-file based on the initial output time point.

In certain embodiments, the division module 1001, the determining module 1002, and the control module 1003 included in the terminal device may all correspond to a processor. The specific structure of the processor may be an electronic device or a set of electronic devices having a processing function such as a central processing unit (CPU), a microcontroller unit (MCU), a digital signal processor (DSP), or a programmable logical controller PLC. The processor includes executable code. The executable code is stored in a storage medium. The processor may be connected to the storage medium by using a communication interface such as a bus, and reads and executes the executable code in the storage medium when performing corresponding specific functions of the modules. The storage medium configured to store the executable code may be a non-transitory storage medium.

The division module 1001, the determining module 1002, and the control module 1003 may be integrated to correspond to a same processor, or separately correspond to different processors. When the division module 1001, the determining module 1002, and the control module 1003 are integrated to correspond to a same processor, the processor processes, by means of time division, functions corresponding to the division module 1001, the determining module 1002, and the control module 1003.

The above terminal device of the present disclosure may provide specific implementation hardware for the methods of previous embodiments, and may be configured to implement the technical solution according to any one of previous embodiments. Similarly, two players are controlled to alternatingly buffer and play a video fragment stream, to greatly reduce initial buffer time. Moreover, in an entire video playing process, fragments of the target file can be flexibly played, without limitation on the fragment time, the encoding format, and the like, and seamless handover is effectively implemented when multiple video fragments are played.

Figure 11:
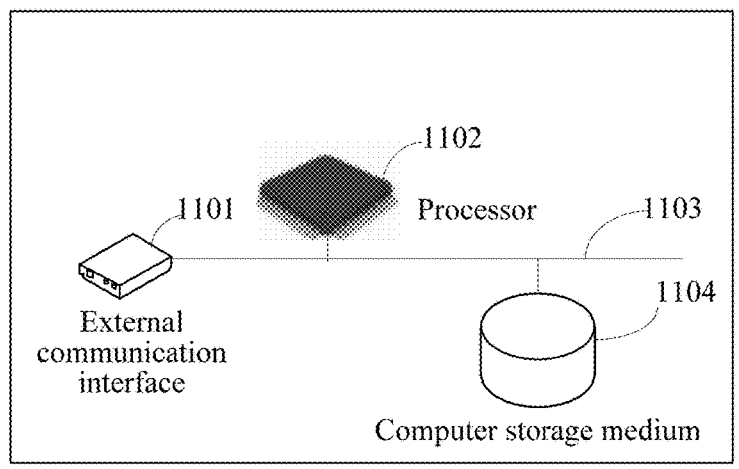
FIG. 11 is a schematic hardware structural diagram of a terminal device according to an embodiment of the present disclosure.

FIG. 11 shows a hardware structural diagram of a media playing apparatus according to an embodiment of the present disclosure. As shown in FIG. 11, the apparatus includes a processor 1102, a computer storage medium 1104, and at least one external communication interface 1101. The processor 1102, the computer storage medium 1104, and the external communication interface 1101 are all connected by using a bus 1103. The processor 1102 may be an electronic component having a processing function, for example, a microprocessor, a central processing unit, a digital signal processor, or a programmable logic array. The computer storage medium 1104 stores computer executable code.

The apparatus may be the terminal device previously described. The storage medium may include a set of instructions, and when executing the instructions, the at least one processor is caused to perform operations including the following operations: dividing content of a target file in the time dimension, to obtain N number of target sub-files, N being an integer greater than or equal to 2; obtaining a first time point, and determining an $n^{th}$ target sub-file in the N number of target sub-files based on the first time point, n being an integer greater than or equal to 1 and less than or equal to N; and setting a first player and a second player, and controlling the first player and the second player to alternatingly obtain and output the $n^{th}$ target sub-file and at least one target sub-file that is after the $n^{th}$ target sub-file.

The controlling the first player and the second player to alternatingly obtain and output the $n^{th}$ target sub-file and at least one target sub-file that is after the $n^{th}$ target sub-file includes: controlling the first player to obtain the $n^{th}$ target sub-file and output the $n^{th}$ target sub-file; controlling the second player to obtain an $(n+1)^{th}$ target sub-file neighboring to the $n^{th}$ target sub-file in the time dimension before outputting of the $n^{th}$ target sub-file is completed; detecting that the first player completes outputting of the $n^{th}$ target sub-file, and controlling the second player to output the $(n+1)^{th}$ target sub-file; before outputting of the $(n+1)^{th}$ target sub-file is completed, controlling the first player to obtain an $(n+2)^{th}$ target sub-file neighboring to the $(n+1)^{th}$ target sub-file in the time dimension, and so on, until outputting of the $n^{th}$ target sub-file and the at least one target sub-file that is after the $n^{th}$ target sub-file is all completed.

In the several embodiments provided in the present disclosure, it should be understood that the disclosed device and method may be implemented in other manners. The device embodiments described above are merely exemplary. For example, division of the units is merely logical function division, and other division manners may be included during actual implementation. For example, multiple units or components may be combined, or may be integrated to another system, or some characteristics may be omitted or not performed. In addition, the displayed or discussed mutual couplings or direct couplings or communication connections between the components may be implemented through some interfaces, indirect couplings or communication connections between the apparatuses or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, functional units in the embodiments of the present invention may be all integrated in a processing unit, each unit is separately used as a unit, or two or more units are integrated in a unit. The integrated unit may be implemented in a form of hardware, or may be implemented in form of hardware plus a software functional unit.

A person of ordinary skill in the art may understand that all or some steps for implementing the foregoing method embodiment may be completed by a program instructing related hardware, the foregoing program may be stored in a computer readable storage medium, and when being executed, the program performs steps including the foregoing method embodiment. The storage medium includes: any medium that can store program code, such as a removable storage device, a read-only memory (ROM, Read-Only Memory), a random-access memory (RAM, Random Access Memory), a magnetic disk, or an optical disc.

Alternatively, when the integrated unit of the present disclosure is implemented in a form of a software functional module, the integrated unit may be stored in a computer-readable storage medium. Based on such an understanding, the technical solutions of the present disclosure may be implemented in a form of a software product. The computer software product is stored in a storage medium and includes several instructions for instructing a computer device (which may be a personal computer, a server, a network device, or the like) to perform all or some of the methods described in the embodiments of the present disclosure. The storage medium includes: various mediums that can store program code, such as a removable storage device, a ROM, a RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

A person of ordinary skill in the art may understand that all or some of the processes of the methods in the embodiments may be implemented by a computer program instructing relevant hardware. The program may be stored in a computer readable storage medium. For example, in the present disclosure, the program may be stored in a storage medium of a computer system, and is executed by at least one processor in the computer system, to perform the processes of the embodiments of the methods. The storage medium may be a magnetic disk, an optical disc, a ROM, a RAM, or the like.

The technical features of the embodiments may be randomly combined. For the purpose of concise description, not all possible combinations of the technical features of the embodiments are described. However, these technical features shall be considered as falling within the scope described in this specification as long as combinations of the technical features have no conflict.

The embodiments describe only several implementations of the present disclosure, which are described specifically in detail. However, it shall not be understood as a limitation on the patent scope of the present disclosure. It should be noted that, a person of ordinary skill in the art may make several modifications and improvements without departing from the idea of the present disclosure. All such modifications and improvements fall within the protection scope of the present disclosure. Therefore, the patent protection scope of the present disclosure shall be subjected to the appended claims.

What is claimed is:

1. A media playing method, comprising:
    dividing content of a target file in a time dimension to obtain N number of target sub-files, N being an integer greater than or equal to 2;
    obtaining a first time point, and determining an $n^{th}$ target sub-file in the N number of target sub-files based on the first time point, n being an integer greater than or equal to 1 and less than or equal to N; and
    setting a first player and a second player;
    controlling the first player to obtain the $n^{th}$ target sub-file and output the $n^{th}$ target sub-file;
    before outputting of the $n^{th}$ target sub-file on the first player is completed, controlling the second player to obtain an $(n+1)^{th}$ target sub-file neighboring to the $n^{th}$ target sub-file in a time dimension;

detecting a time difference between a current output time of the $n^{th}$ target sub-file of the first player and an end time of the $n^{th}$ target sub-file;

determining whether the time difference is less than a first preset threshold value and, when it is determined that the time difference is less than the first preset threshold value, controlling the second player to switch from a buffering state to an outputting state;

when detecting that outputting of the $n^{th}$ target sub-file on the first player reaches the end time, controlling the second player to output the $(n+1)^{th}$ target sub-file;

before outputting of the $(n+1)^{th}$ target sub-file on the second player is completed, controlling the first player to obtain an $(n+2)^{th}$ target sub-file neighboring to the $(n+1)^{th}$ target sub-file in the time dimension; and repeatedly controlling the first player and the second player to alternatingly output any remaining target sub-files until outputting of the $n^{th}$ target sub-file and at least one target sub-file that is after the $n^{th}$ target sub-file is all completed.

2. The method according to claim 1, wherein the controlling the first player to obtain the $n^{th}$ target sub-file and output the $n^{th}$ target sub-file comprises:

controlling the first player to be in a buffering state;

obtaining and buffering the $n^{th}$ target sub-file from a server based on address information of the $n^{th}$ target sub-file of the target file on the server; and parsing the $n^{th}$ target sub-file, switching the first player from the buffering state to an outputting state, and controlling the first player to output the $n^{th}$ target sub-file.

3. The method according to claim 1, wherein the controlling the second player to obtain an $(n+1)^{th}$ target sub-file neighboring to the $n^{th}$ target sub-file in the time dimension comprises:

controlling the second player to enter a buffering state when outputting of the $n^{th}$ target sub-file on the first player is started;

obtaining and buffering the $(n+1)^{th}$ target sub-file from a server based on address information of the $(n+1)^{th}$ target sub-file of the target file on the server; and parsing the $(n+1)^{th}$ target sub-file.

4. The method according to claim 1, wherein the determining an $n^{th}$ target sub-file in the N number of target sub-files based on the first time point comprises:

based on the first time point and duration of each of the N number of target sub-files, determining the $n^{th}$ target sub-file corresponding to the first time point.

5. The method according to claim 4, wherein the outputting the $n^{th}$ target sub-file comprises:

determining an initial output time point of the $n^{th}$ target sub-file based on the first time point and duration of the $n^{th}$ target sub-file; and outputting the $n^{th}$ target sub-file based on the initial output time point.

6. A terminal device, comprising:

a memory storing computer program instructions; and a processor coupled to the memory and, when executing the computer program instructions, configured to perform:

dividing content of a target file in a time dimension to obtain N number of target sub-files, N being an integer greater than or equal to 2;

obtaining a first time point, and determining an $n^{th}$ target sub-file in the N number of target sub-files based on the first time point, n being an integer greater than or equal to 1 and less than or equal to N; and setting a first player and a second player;

controlling the first player to obtain the $n^{th}$ target sub-file and output the $n^{th}$ target sub-file;

before outputting of the $n^{th}$ target sub-file on the first player is completed, controlling the second player to obtain an $(n+1)^{th}$ target sub-file neighboring to the $n^{th}$ target sub-file in a time dimension;

detecting a time difference between a current output time of the $n^{th}$ target sub-file of the first player and an end time of the $n^{th}$ target sub-file;

determining whether the time difference is less than a first preset threshold value and, when it is determined that the time difference is less than the first preset threshold value, controlling the second player to switch from a buffering state to an outputting state;

when detecting that outputting of the $n^{th}$ target sub-file on the first player reaches the end time, controlling the second player to output the $(n+1)^{th}$ target sub-file;

before outputting of the $(n+1)^{th}$ target sub-file on the second player is completed, controlling the first player to obtain an $(n+2)^{th}$ target sub-file neighboring to the $(n+1)^{th}$ target sub-file in the time dimension; and repeatedly controlling the first player and the second player to alternatingly output any remaining target sub-files until outputting of the $n^{th}$ target sub-file and at least one target sub-file that is after the $n^{th}$ target sub-file is all completed.

7. The terminal device according to claim 6, wherein the controlling the first player to obtain the $n^{th}$ target sub-file and output the $n^{th}$ target sub-file comprises:

controlling the first player to be in a buffering state;

obtaining and buffering the $n^{th}$ target sub-file from a server based on address information of the $n^{th}$ target sub-file of the target file on the server; and parsing the $n^{th}$ target sub-file, switching the first player from the buffering state to an outputting state, and controlling the first player to output the $n^{th}$ target sub-file.

8. The terminal device according to claim 6, wherein the controlling the second player to obtain an $(n+1)^{th}$ target sub-file neighboring to the $n^{th}$ target sub-file in the time dimension comprises:

controlling the second player to enter a buffering state when outputting of the $n^{th}$ target sub-file on the first player is started;

obtaining and buffering the $(n+1)^{th}$ target sub-file from a server based on address information of the $(n+1)^{th}$ target sub-file of the target file on the server; and parsing the $(n+1)^{th}$ target sub-file.

9. The terminal device according to claim 6, wherein the determining an $n^{th}$ target sub-file in the N number of target sub-files based on the first time point comprises:

based on the first time point and duration of each of the N number of target sub-files, determining the $n^{th}$ target sub-file corresponding to the first time point.

10. The terminal device according to claim 9, wherein the outputting the $n^{th}$ target sub-file comprises:

determining an initial output time point of the $n^{th}$ target sub-file based on the first time point and duration of the $n^{th}$ target sub-file; and outputting the $n^{th}$ target sub-file based on the initial output time point.

11. A non-transitory computer-readable storage medium storing computer program instructions executable by at least one processor to perform:

dividing content of a target file in a time dimension to obtain N number of target sub-files, N being an integer greater than or equal to 2;

obtaining a first time point, and determining an $n^{th}$ target sub-file in the N number of target sub-files based on the first time point, n being an integer greater than or equal to 1 and less than or equal to N; and setting a first player and a second player;

controlling the first player to obtain the $n^{th}$ target sub-file and output the $n^{th}$ target sub-file;

before outputting of the $n^{th}$ target sub-file on the first player is completed, controlling the second player to obtain an $(n+1)^{th}$ target sub-file neighboring to the $n^{th}$ target sub-file in a time dimension;

detecting a time difference between a current output time of the $n^{th}$ target sub-file of the first player and an end time of the $n^{th}$ target sub-file;

determining whether the time difference is less than a first preset threshold value and, when it is determined that the time difference is less than the first preset threshold value, controlling the second player to switch from a buffering state to an outputting state;

when detecting that outputting of the $n^{th}$ target sub-file on the first player reaches the end time, controlling the second player to output the $(n+1)^{th}$ target sub-file;

before outputting of the $(n+1)^{th}$ target sub-file on the second player is completed, controlling the first player to obtain an $(n+2)^{th}$ target sub-file neighboring to the $(n+1)^{th}$ target sub-file in the time dimension; and repeatedly controlling the first player and the second player to alternatingly output any remaining target sub-files until outputting of the $n^{th}$ target sub-file and at least one target sub-file that is after the $n^{th}$ target sub-file is all completed.

12. The non-transitory computer-readable storage medium according to claim 11, wherein the controlling the first player to obtain the $n^{th}$ target sub-file and output the $n^{th}$ target sub-file comprises:

controlling the first player to be in a buffering state;

obtaining and buffering the $n^{th}$ target sub-file from a server based on address information of the $n^{th}$ target sub-file of the target file on the server; and parsing the $n^{th}$ target sub-file, switching the first player from the buffering state to an outputting state, and controlling the first player to output the $n^{th}$ target sub-file.

13. The non-transitory computer-readable storage medium according to claim 11, wherein the controlling the second player to obtain an $(n+1)^{th}$ target sub-file neighboring to the $n^{th}$ target sub-file in the time dimension comprises:

controlling the second player to enter a buffering state when outputting of the $n^{th}$ target sub-file on the first player is started;

obtaining and buffering the $(n+1)^{th}$ target sub-file from a server based on address information of the $(n+1)^{th}$ target sub-file of the target file on the server; and parsing the $(n+1)^{th}$ target sub-file.

14. The non-transitory computer-readable storage medium according to claim 11, wherein the determining an $n^{th}$ target sub-file in the N number of target sub-files based on the first time point comprises:

based on the first time point and duration of each of the N number of target sub-files, determining the $n^{th}$ target sub-file corresponding to the first time point.

15. The non-transitory computer-readable storage medium according to claim 14, wherein the outputting the $n^{th}$ target sub-file comprises:

determining an initial output time point of the $n^{th}$ target sub-file based on the first time point and duration of the $n^{th}$ target sub-file; and outputting the $n^{th}$ target sub-file based on the initial output time point.

\* \* \* \* \*